US012627005B2

(12) United States Patent
Yang et al.

(10) Patent No.: US 12,627,005 B2
(45) Date of Patent: *May 12, 2026

(54) BATTERY PACK INCLUDING CONNECTION PLATE

(71) Applicant: LG ENERGY SOLUTION, LTD., Seoul (KR)

(72) Inventors: Jin-Oh Yang, Daejeon (KR); Seog-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 87 days.

This patent is subject to a terminal disclaimer.

(21) Appl. No.: 18/637,211

(22) Filed: Apr. 16, 2024

(65) Prior Publication Data

US 2024/0266680 A1     Aug. 8, 2024

Related U.S. Application Data

(63) Continuation of application No. 16/767,748, filed as application No. PCT/KR2019/011204 on Aug. 30, 2019, now Pat. No. 11,990,644.

(30) Foreign Application Priority Data

Oct. 4, 2018     (KR) ........................ 10-2018-0118477

(51) Int. Cl.
*H01M 10/00*          (2006.01)
*H01M 50/213*          (2021.01)
(Continued)

(52) U.S. Cl.
CPC ....... *H01M 50/502* (2021.01); *H01M 50/213* (2021.01); *H01M 50/258* (2021.01);
(Continued)

(58) Field of Classification Search
CPC ............. H01M 50/502; H01M 50/213; H01M 50/258; H01M 50/298; H01M 50/50;
(Continued)

(56) References Cited

U.S. PATENT DOCUMENTS 8,785,027 B2     7/2014   Soong et al.
9,153,799 B2     10/2015  Kim et al.
(Continued)

FOREIGN PATENT DOCUMENTS

CN          102057519 A     5/2011
CN          104701912 A     6/2015
(Continued)

OTHER PUBLICATIONS

Office Action dated Jun. 7, 2021, issued in the corresponding Japanese Patent Application No. 2020-526197.
(Continued)

*Primary Examiner* — Nicholas P D'Aniello
(74) *Attorney, Agent, or Firm* — Morgan, Lewis & Bockius LLP

(57)          ABSTRACT

A battery pack includes a plurality of battery modules arranged in a front and rear direction, and each of the plurality of battery modules includes a plurality of cylindrical battery cells; a module housing having a plurality of hollows in which the plurality of cylindrical battery cells are accommodated; and a connection plate having a body portion at the upper portion or the lower portion of the plurality of cylindrical battery cells and provided with a plurality of connection terminals respectively in electrical contact and connection with the electrode terminal at one of the plurality of cylindrical battery cells, and a connection portion to protrusively extend in a left direction or a right direction from the body portion so that the protrusively extending portion is bent upward or downward from the body portion
(Continued)

and the bent end is in contact and connection with a portion of another connection plate.

18 Claims, 11 Drawing Sheets

(51) Int. Cl.

| | |
|---|---|
| *H01M 50/258* | (2021.01) |
| *H01M 50/298* | (2021.01) |
| *H01M 50/50* | (2021.01) |
| *H01M 50/502* | (2021.01) |
| *H01M 50/503* | (2021.01) |

(52) U.S. Cl.
CPC ......... *H01M 50/298* (2021.01); *H01M 50/50* (2021.01); *H01M 50/503* (2021.01)

(58) Field of Classification Search
CPC ............... H01M 50/503; H01M 50/20; H01M 2220/20; H01M 2220/30; Y02E 60/10
See application file for complete search history.

(56) References Cited

U.S. PATENT DOCUMENTS

| | | | |
|---|---|---|---|
| 11,990,644 B2 * | 5/2024 | Yang .................. | H01M 50/258 |
| 2009/0148754 A1 | 6/2009 | Marchio et al. | |
| 2009/0297892 A1 | 12/2009 | Ijaz et al. | |
| 2010/0047676 A1 | 2/2010 | Park et al. | |
| 2011/0117412 A1 | 5/2011 | Park | |
| 2013/0052515 A1 | 2/2013 | Park et al. | |
| 2013/0136969 A1 | 5/2013 | Yasui et al. | |
| 2013/0230761 A1 | 9/2013 | Okutani et al. | |
| 2013/0344376 A1 | 12/2013 | Asaida et al. | |
| 2015/0072217 A1 | 3/2015 | Kim et al. | |
| 2015/0224893 A1 | 8/2015 | Motokawa | |
| 2015/0255225 A1 | 9/2015 | Kusaba et al. | |
| 2015/0287964 A1 | 10/2015 | Park et al. | |
| 2016/0181579 A1 | 6/2016 | Geshi et al. | |
| 2017/0288199 A1 | 10/2017 | Nakayama et al. | |
| 2018/0006280 A1 | 1/2018 | Ovadia et al. | |
| 2018/0233723 A1 | 8/2018 | Morioka | |
| 2018/0277803 A1 | 9/2018 | Park et al. | |
| 2020/0014006 A1 * | 1/2020 | Oliveira .............. | H01M 10/625 |
| 2021/0151829 A1 * | 5/2021 | Ishibashi ............. | H01M 50/249 |

FOREIGN PATENT DOCUMENTS

| | | |
|---|---|---|
| CN | 105474434 A | 4/2016 |
| CN | 206098524 U | 4/2017 |
| GB | 2560039 A | 8/2018 |
| JP | 2012-238393 A | 12/2012 |
| JP | 2015-099726 A | 5/2015 |
| JP | 2016-091959 A | 5/2016 |
| JP | 2017-91989 A | 5/2017 |
| JP | 2017-091989 A | 5/2017 |
| JP | 2017-157509 A | 9/2017 |
| JP | 2018041633 A | 3/2018 |
| JP | 2018-41633 A | 9/2019 |
| KR | 10-0886571 B1 | 3/2009 |
| KR | 10-2010-0134111 A | 12/2010 |
| KR | 10-2011-0054662 A | 5/2011 |
| KR | 10-1520902 B1 | 5/2015 |
| KR | 10-1720636 B1 | 3/2017 |
| KR | 10-1844466 B1 | 4/2018 |
| KR | 10-2018-0053152 A | 5/2018 |
| KR | 10-2018-0101668 A | 9/2018 |
| WO | 2012/073399 A1 | 6/2012 |
| WO | 2014083600 A1 | 6/2014 |
| WO | 2018/150279 A1 | 8/2018 |

OTHER PUBLICATIONS

International Search Report issued in corresponding International Patent Application No. PCT/KR2019/011204, dated Dec. 27, 2019.
Office Action dated Jan. 30, 2022, issued in the corresponding Chinese Patent Application No. 201980005961.2.
Chinese Office Action issued in corresponding Chinese Patent Application No. 201980005961.2, dated Jul. 18, 2022.
English translation of JP 2017-091989.

* cited by examiner

BATTERY PACK INCLUDING CONNECTION PLATE

The present application is a continuation of U.S. patent application Ser. No. 16/767,748, filed May 28, 2020, which claims priority to Korean Patent Application No. 10-2018-0118477 filed on Oct. 4, 2018, in the Republic of Korea, the disclosures of which are incorporated herein by reference.

TECHNICAL FIELD

The present disclosure relates to a battery pack including a connection plate, and more particularly, to a battery pack including a plurality of battery modules in a slimmer design and having an improved energy density.

BACKGROUND ART

Secondary batteries are highly applicable to various products and has electrical characteristics with high energy density. The secondary battery is applied not only to portable electronic devices but also to electric vehicles, hybrid electric vehicles, power storage devices, and the like, driven by an electric driving source.

The secondary battery is attracting attention as a new energy source for improving eco-friendliness and energy efficiency since the use of fossil fuels is significantly reduced and no by-product is generated during the use of energy.

A battery pack applied to an electric vehicle has a structure in which a plurality of battery modules, each having a plurality of battery cells, are connected to obtain a high output. In addition, each battery cell is an electrode assembly including positive and negative electrode current collectors, a separator, an active material, an electrolyte, and the like to be repeatedly charged and discharged by an electrochemical reaction between the components.

Recently, as the necessity for a large capacity structure increases along with application as an energy storage source, there is an increasing demand for a battery pack having a multi-module structure, in which a plurality of battery modules, each having a plurality of secondary batteries in series and/or in parallel, are aggregated. In this case, a plurality of battery modules are arranged in close contact in a front and rear direction so that a large number of battery modules are accommodated in a limited space inside the battery pack.

In addition, the conventional battery pack has a metal plate configured to electrically connect a plurality of battery modules to each other and to electrically connect a plurality of cylindrical battery cells provided in each battery module.

However, if a plurality of battery modules are closely arranged in the front and rear direction, a separate space for welding metal plates should be separately provided in a module housing of the battery module in order to connect a metal plate mounted to one battery module with a metal plate of another battery module.

For this reason, the conventional battery module has a dead space formed in the module housing and thus has a limitation in including a larger number of cylindrical battery cells, and thus, the energy density of the battery pack greatly deteriorates.

DISCLOSURE

Technical Problem

The present disclosure is designed to solve the problems of the related art, and therefore the present disclosure is directed to providing a battery pack, which may include a plurality of battery modules in a slimmer design and have an improved energy density.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:

a plurality of battery modules arranged in a front and rear direction, wherein each of the plurality of battery modules includes:

a plurality of cylindrical battery cells arranged in a horizontal direction and having electrode terminals formed at an upper portion and a lower portion thereof, respectively;

a module housing having a plurality of hollows in which the plurality of cylindrical battery cells are inserted and accommodated; and a connection plate having a body portion located at the upper portion or the lower portion of the plurality of cylindrical battery cells and provided with a plurality of connection terminals respectively in electrical contact and connection with the electrode terminal formed at one of the plurality of cylindrical battery cells, and a connection portion configured to protrusively extend in a left direction or a right direction from the body portion so that the protrusively extending portion is bent upward or downward from the body portion and the bent end is in contact and connection with a portion of another connection plate.

Also, the connection plate may include a first connection plate having the body portion located at the upper portion of the plurality of cylindrical battery cells and having the connection portion protrusively extending from the body portion and bent downward; and a second connection plate having the body portion located at the lower portion of the plurality of cylindrical battery cells and having the connection portion protrusively extending from the body portion and bent upward.

Moreover, the connection portion of the first connection plate may be in contact and connection with the connection portion of the second connection plate provided at another battery module.

In addition, the connection portion of at least one of the first connection plate and the second connection plate may have an expanded structure protrusively extending forward further to a foremost terminal of the module housing or protrusively extending rearward further to a rearmost terminal of the module housing.

Further, a rib may be formed at an outer wall of the module housing to protrusively extend in a horizontal direction from an outer surface thereof.

Also, the module housing may include fixing tubes located at left and right outer sides thereof and having a hollow structure perforated in a vertical direction.

Further, the fixing tube may have a vertical terminal protrusively extending in a vertical direction further to an upper surface or a lower surface of the module housing, and the body portion may have a guide hole perforated in a vertical direction so that the terminal of the fixing tube protruding in a vertical direction is inserted therein.

Also, the connection portion may be located to face left and right outer sides of the fixing tube.

Moreover, the module housing may include a protection plate ridged outward from the left and right outer walls thereof and having a plate shape with a predetermined thickness.

In addition, the battery module may further include a protection member at least partially inserted and fixed in an outer wall of the module housing at a location facing the connection portion and having a plate shape with a predetermined thickness.

Further, the connection portion may have a bent structure at which an end thereof is bent upward or downward.

Also, the battery pack may further comprise a plurality of other battery modules located above the plurality of battery modules.

Moreover, the battery pack may further comprise a plurality of other battery modules located above the plurality of battery modules, and a connection bus bar having an electrically conductive material is provided to electrically connect at least two first connection plates, or at least two second connection plates, or a first connection plate and a second connection plate, respectively included in the plurality of battery modules and the plurality of other battery modules located above the plurality of battery modules.

In addition, the connection bus bar may include a first contact portion provided in contact with any one of the first connection plate and the second connection plate; a second contact portion provided in contact with the other of the first connection plate and the second connection plate; and a detouring portion having both ends respectively connected to the first contact portion and the second contact portion, the detouring portion being stepped outward from the first contact portion and the second contact portion.

Further, the battery pack may further comprise a plurality of battery modules; a plurality of other battery modules located above or below the plurality of battery modules; and a third connection plate configured to electrically connect the plurality of battery modules and the plurality of other battery modules located above or below the plurality of battery modules.

Also, the third connection plate may include a body portion located at the upper portion or the lower portion of the plurality of cylindrical battery cells and having a plurality of connection terminals respectively in electrical contact and connection with the electrode terminal formed at one of the plurality of cylindrical battery cells; and a second connection portion configured to be bent and extending upward or downward from a left or right end of the body portion to be in contact and connection with a portion of a connection plate of another battery module mounted to an upper side.

Moreover, a hook structure may be formed at left and right outer walls of the module housing to protrusively extend outward from the outer walls of the module housing so that the connection portion of the connection plate is closely fixed to the outer wall of the module housing.

In addition, in another aspect of the present disclosure, there is also provided an electronic device comprising the battery pack according to the present disclosure.

Further, in another aspect of the present disclosure, there is also provided a vehicle comprising the battery pack according to the present disclosure.

Advantageous Effects

According to an embodiment of the present disclosure, since the battery pack of the present disclosure includes a connection plate having a body portion mounted to the upper portion or the lower portion of the module housing and a connection portion extending in the left and right direction of the body portion and bent upward or downward, unlike the conventional battery pack, the connection plates may be in contact and connection with each other at the left and right outer sides of the module housing. Accordingly, unlike the conventional art, it is not necessary to secure a space for contact and connection between the connection plates in the module housing, thereby enabling a slimmer battery module. Ultimately, the slim battery pack may have a maximized energy density.

Also, according to this embodiment of the present disclosure, since the connection portion of at least one of the first connection plate and the second connection plate has the expanded structure protrusively extending forward further to the foremost terminal of the module housing or protrusively extending rearward further to the rearmost terminal of the module housing, one connection plate may be in contact with the other connection plate without a separate connection member. Accordingly, the manufacturing cost of the battery pack may be reduced and the manufacturing process may be simplified.

Moreover, according to an embodiment of the present disclosure, since the outer wall of the module housing has the rib protrusively extending in the horizontal direction from the outer surface thereof, it is possible to secure a predetermined mechanical rigidity of the outer wall of the module housing and form an empty space in the outer wall of the module housing, thereby reducing the weight of the module housing.

Also, since the rib of the present disclosure has the protruding wall protrusively extending outward to support the connection portions of the first connection plate and the second connection plate, the welding process may be easily performed between the connection plates. In addition, since the rib may form an empty space between the outer wall of the module housing and the connection portions of the first connection plate and the second connection plate, it is possible to minimize the damage to the module housing caused by the heat of welding.

In addition, according to an embodiment of the present disclosure, since the overlapped region of the connection portions of the first connection plate and the second connection plate is located to face the left outer side or the right outer side of the fixing tube, namely since the connection portions are located as far from the cylindrical battery cells as possible, the amount of heat generated during the welding process of the connection portion and transferred to the cylindrical battery cells of the battery module may be minimized. Accordingly, it is possible to prevent that the performance of the cylindrical battery cell deteriorates or a fire occurs due to overheating that may occur in the welding process, thereby effectively reducing the defective rate.

Further, according to an embodiment of the present disclosure, since the protection member is inserted and fixed at a location (portion) of the outer wall of the module housing facing the connection portion, when the connection portions of the first connection plate and the second connection plate are welded to each other, it is possible to reduce the amount of welding heat conducted into the inside of the module housing or to prevent the module housing from being melted and damaged. As a result, damage to the battery module caused by welding between the connection plates may be minimized.

Also, according to an embodiment of the present disclosure, since the bent structure is formed at the end of the connection portion bent upward or downward, when the connection portions of the first connection plate and the second connection plate are welded to each other, it is possible to effectively reduce the amount of generated welding heat conducted to the inside of the module housing, without any separate member. Accordingly, damage to the battery module caused by welding between the connection plates may be minimized.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is a perspective front view schematically showing a battery module, employed at the battery pack according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
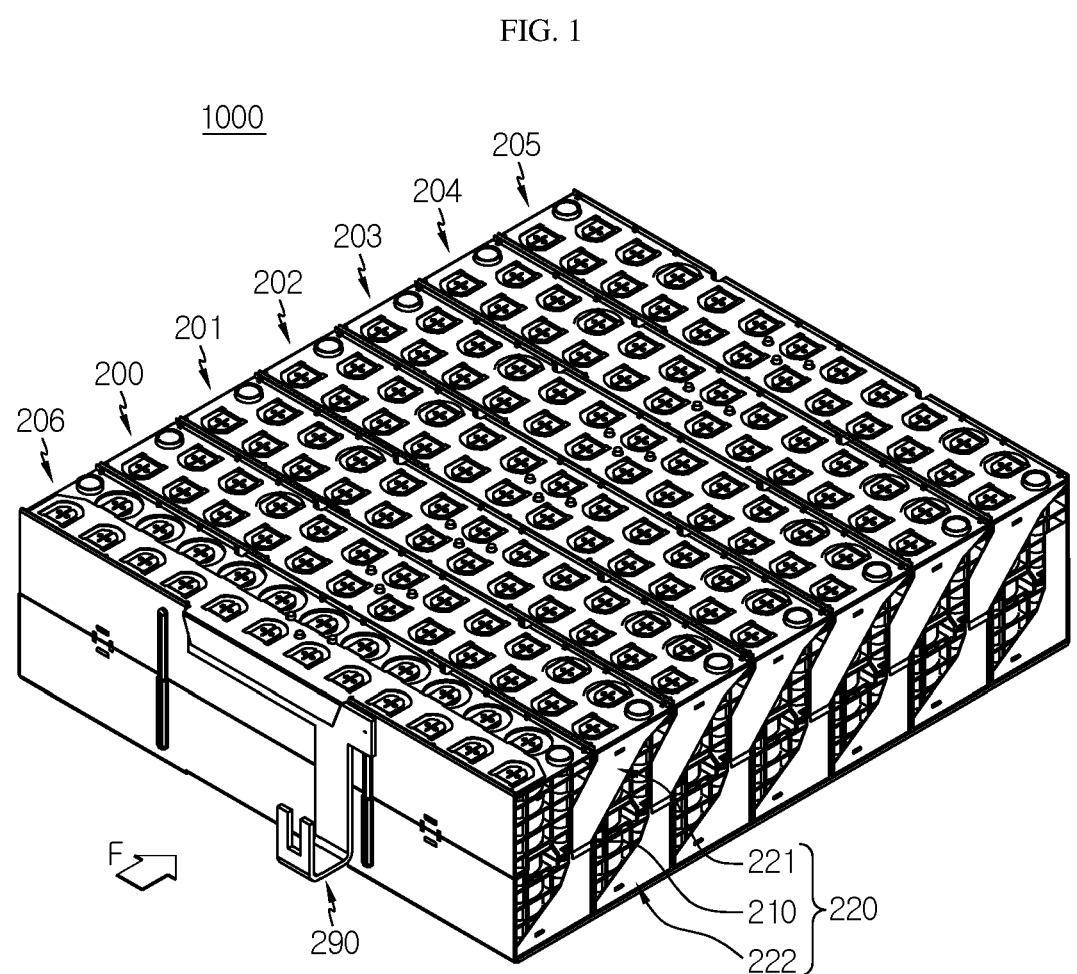
FIG. 1 is a perspective view schematically showing a battery pack according to an embodiment of the present disclosure.
Figure 2:
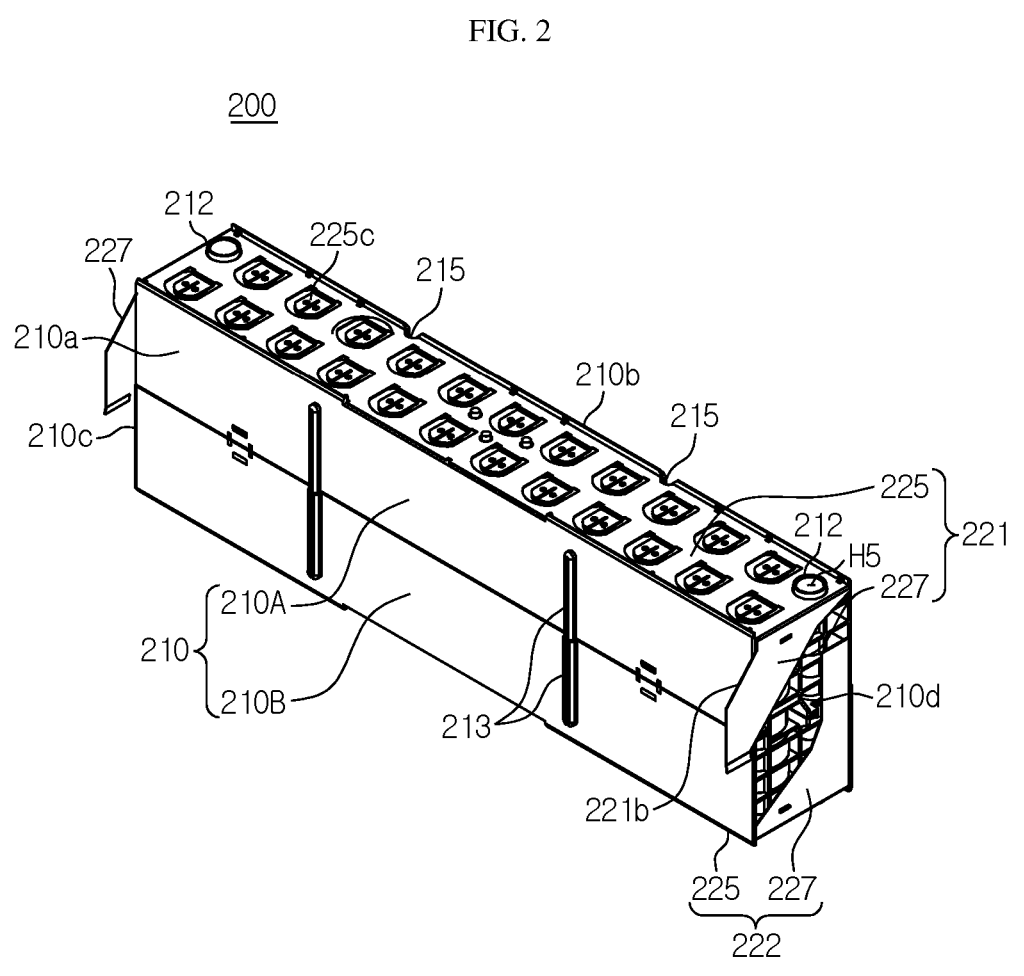
Figure 3:
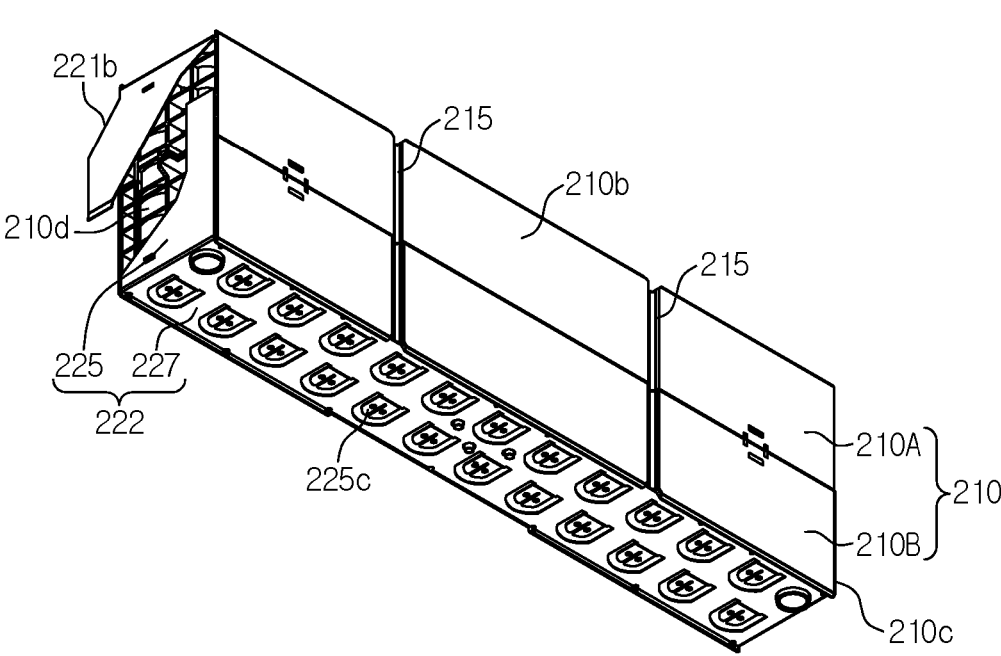
FIG. 3 is a perspective rear view schematically showing the battery module, employed at the battery pack according to an embodiment of the present disclosure.
Figure 4:
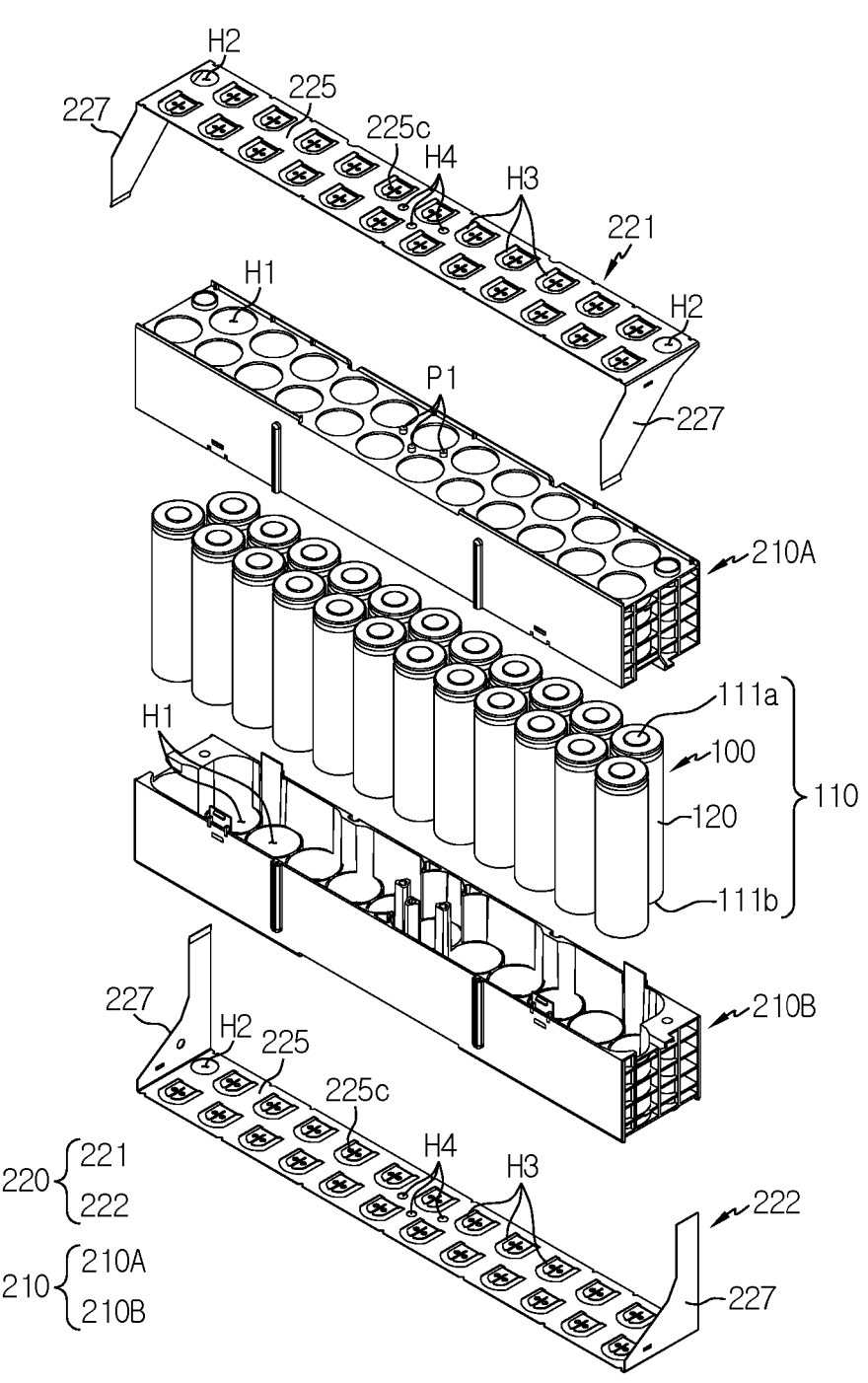
FIG. 4 is an exploded perspective view showing components of the battery module, employed at the battery pack according to an embodiment of the present disclosure.

FIG. 1 is a perspective view schematically showing a battery pack according to an embodiment of the present disclosure. FIG. 2 is a perspective front view schematically showing a battery module, employed at the battery pack according to an embodiment of the present disclosure. FIG. 3 is a perspective rear view schematically showing the battery module, employed at the battery pack according to an embodiment of the present disclosure. Also, FIG. 4 is an exploded perspective view showing components of the battery module, employed at the battery pack according to an embodiment of the present disclosure.

Referring to FIGS. 1 to 4, a battery pack 1000 according to the present disclosure includes a plurality of battery modules 200, 201, 202, 203, 204, 205, 206 arranged in the front and rear direction.

Specifically, the battery module 200 may include a plurality of cylindrical battery cells 100, a module housing 210, and a connection plate 220.

Here, the cylindrical battery cell 100 may include a cylindrical battery can 120 and an electrode assembly (not shown) accommodated in the battery can 120.

Here, the cylindrical battery cell 100 may be configured such that the battery can 120 stands up in the vertical direction. Also, the battery can 120 may include a material with high electrical conductivity. For example, the battery can 120 may include an aluminum or copper.

In addition, electrode terminals 111*a*, 111*b* may be formed at an upper portion and a lower portion of the battery can 120, respectively. Specifically, a first electrode terminal 111*a* may be formed at a flat circular upper surface of the upper end of the battery can 120, and a second electrode terminal 111*b* may be formed at a flat circular bottom of the lower end of the battery can 120.

Also, an electrical insulation member may be coated on a side portion of the battery can 120. That is, since the battery can 120 is electrically connected to the electrodes of the electrode assembly therein, for example, an insulating film (not shown) may be coated to surround the side portion of the battery can 120 in order to prevent an unintended conductive object from contacting the battery can 120 and causing electricity leakage.

In addition, the electrode assembly (not shown) may be wound in a jelly-roll form in a state where a separator is interposed between a positive electrode and a negative electrode. A positive electrode tab may be attached to the positive electrode (not shown) and connected to the first electrode terminal 111*a* at the upper end of the battery can 120. A negative electrode tab may be attached to the negative electrode (not shown) and connected to the second electrode terminal 111*b* at the lower end of the battery can 120.

Further, when viewed in the F direction, the plurality of cylindrical battery cells 100 may be arranged in the horizontal direction to stand up in the vertical direction inside the module housing 210.

For example, as shown in FIG. 4, one battery module 200 includes 23 cylindrical battery cells 100. The 23 cylindrical battery cells 100 may be arranged to be adjacent to each other in the horizontal direction in a state of standing up in the vertical direction. Further, the positive electrode of the cylindrical battery cell 100 may be formed at the upper end thereof, and the negative electrode may be formed at the lower end thereof.

Here, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Here, the module housing 210 may be formed to have an inner space in which the plurality of cylindrical battery cells 100 are inserted and accommodated. Specifically, the module housing 210 may have a plurality of hollows H1 formed to surround the outer surface of the cylindrical battery cell 100. Further, the module housing 210 may include left and right outer walls 210*c*, 210*d* and front and rear outer walls 210*a*, 210*b*.

In addition, the module housing 210 may include an upper case 210A and a lower case 210B.

Here, in the upper case 210A may have a hollow H1 formed to surround the outer surface of the upper portion of the cylindrical battery cell 100. Further, the lower case 210B may be fastened to the lower portion of the upper case 210A and have a hollow H1 formed to surround the outer surface of the lower portion of the cylindrical battery cell 100.

In addition, a coupling protrusion 213 may be formed on the front outer wall 210*a* of the module housing 210 to protrusively extend from the outer surface of the outer wall 210*a*. Also, a guide groove 215 dented inward from the outer surface of the outer wall 210*b* may be formed at the rear outer wall 210*b* of the module housing 210 so that the coupling protrusion 213 is inserted therein.

For example, as shown in FIG. 2, two coupling protrusions 213 may be formed on the front outer wall 210*a* of the module housing 210. In addition, as shown in FIG. 3, two guide grooves 215 may be formed at the rear outer wall 210*b* of the module housing 210.

Thus, according to this configuration of the present disclosure, since the coupling protrusion 213 of the module housing 210 of the present disclosure may be inserted into the guide groove 215 of another battery module 200 to guide the arrangement of the plurality of battery modules 200, the battery modules 200 may not only be arranged easily and but also be fixed to each other without being easily separated.

In addition, the connection plate 220 may include a body portion 225 and a connection portion 227. Specifically, the body portion 225 may be located at an upper portion or a lower portion of the plurality of cylindrical battery cells 100. That is, the body portion 225 may be mounted to the upper portion or the lower portion of the module housing 210. In this case, a guide protrusion P1 protruding upward or downward may be formed at the upper portion or the lower portion of the module housing 210 to guide a location at which the body portion 225 of the connection plate 220 is mounted. In addition, the connection plate 220 may have a guide hole H4 perforated such that the guide protrusion P1 is inserted therein.

Further, the connection plate 220 may include an electrically conductive material. For example, the electrically conductive material may be a metal alloy mainly including copper, nickel, aluminum, gold, silver, or the like.

For example, as shown in FIG. 4, the battery module 200 may have two connection plates 221, 222 respectively located at the upper portion and the lower portion of the plurality of cylindrical battery cells 100. In addition, three guide holes H4 may be formed in the connection plate 221 mounted to the upper portion of the module housing 210, and three guide protrusions P1 may be formed on the upper portion of the module housing 210. Further, three guide holes H4 may be formed in the connection plate 222 mounted to the lower portion of the module housing 210, and three guide protrusions P1 (not shown) may be formed on the lower portion of the module housing 210.

Further, the body portion 225 may include a plurality of connection terminals 225*c* provided in a partial region thereof to be in electrical contact and connection with the electrode terminals 111 of the plurality of cylindrical battery cells 100.

Specifically, at least one connection opening H3 perforated in a vertical direction may be formed in the body portion 225. Also, the connection terminal 225*c* of the connection plate 220 may be formed to protrusively extend in a horizontal direction from an inner side of the edge of the connection opening H3 to be in electrical contact and connection with the electrode terminals 111 formed at the plurality of cylindrical battery cells 100. Moreover, the protrusively extending end of the connection terminal 225*c* may have a branched structure that is split into two sides with respect to the protrusively extending direction.

For example, as shown in FIG. 4, 23 connection openings H3 may be formed in each of the two connection plates 221, 222. In addition, 23 connection terminals 225*c* may be respectively formed at the 23 connection openings H3 to protrusively extend horizontally from the inner side of the edge thereof. Further, the connection terminal 225*c* may have a branched structure that is split into two sides with respect to the protrusively extending direction.

Meanwhile, the connection portion 227 may be formed to protrusively extend in a left direction or a right direction from the body portion 225. Also, the protrusively extending portion of the connection portion 227 may be bent upward or downward from the body portion 225. In addition, the bent end of the connection portion 227 may be in contact and connection with a portion of the other connection plate 220.

For example, as shown in FIGS. 1 to 4, two connection portions 227 bent and extending downward from left and right ends of the body portion 225 may be formed at the connection plate 221 mounted to the upper portion of the module housing 210 of one battery module 200. Also, the bent end of the connection portion 227 may be in contact and connection with a portion of the connection plate 222 of another battery module 206. Further, two connection portions 227 bent and extending upward from the left and right ends of the body portion 225 may be formed at the connection plate 222 mounted to the lower portion of the module housing 210. In addition, the bent end of the connection portion 227 may be in contact and connection with a portion of the other connection plate 220.

Thus, according to this configuration of the present disclosure, since there is provided the connection plate 220 having the body portion 225 mounted to the upper portion or the lower portion of the module housing 210 and the connection portion 227 extending in the left and right direction of the body portion 225 and bent upward or downward, unlike from the conventional battery pack 1000, the connection plates 220 may be in contact and connection with each other in the left and right direction of the module housing 210. Accordingly, unlike the conventional art, it is not necessary to secure a space in the front and rear direction for allowing the connection plates 221, 222 to contact and connect each other inside the module housing, thereby implementing the battery module 200 with a slimmer design in the front and rear direction. Ultimately, the energy density of the battery pack 1000 may be maximized.

Referring to FIGS. 1 to 4, the connection plate 220 may include a first connection plate 221 and a second connection plate 222.

Specifically, in the first connection plate 221, the body portion 225 may be located at the upper portion of the plurality of cylindrical battery cells 100. Also, the connection portion 227 protrusively extending from the body portion 225 may be bent downward. For example, the first connection plate 221 may be electrically connected (bonded) with the electrode terminals 111*a* located at the upper portion of the plurality of cylindrical battery cells 100. Moreover, the connection portion 227 of the first connection plate 221 may be in electrical contact (bond) with the connection portion 227 of the second connection plate 222 provided to another battery module 200. In addition, the connection terminal 225*c* of the first connection plate 221 may be bonded to the first electrode terminal 111*a* of the plurality of cylindrical battery cells 100 by means of resistance welding.

Further, in the second connection plate 222, the body portion 225 may be located at the lower portion of the plurality of cylindrical battery cells 100, and the connection portion 227 protrusively extending from the body portion 225 may be bent upward. For example, the second connection plate 222 may be in electric connection (contact) with the electrode terminal 111*b* located at the lower portion of the plurality of cylindrical battery cells 100. Moreover, the connection portion 227 of the second connection plate 222 may be in electrical contact with the connection portion 227 of the first connection plate 221 provided to another battery module 200. In addition, the connection terminal 225*c* of the second connection plate 222 may be bonded to the second electrode terminal 111*b* of the plurality of cylindrical battery cells 100 by means of resistance welding.

Also, the connection portion 227 of at least one of the first connection plate 221 and the second connection plate 222 may have an expanded structure 221*b* protrusively extending forward further to a foremost terminal of the module housing 210. Alternatively, the connection portion 227 of at least one of the first connection plate 221 and the second connection plate 222 may have an expanded structure 221*b* protrusively extending rearward further to a rearmost terminal of the module housing 210.

Specifically, the connection portion 227 of the first connection plate 221 may have an expanded structure 221*b* protrusively extending forward further to the foremost terminal of the module housing 210. Moreover, the connection portion 227 of the second connection plate 222 may have an expanded structure (not shown) protrusively extending rearward further to the rearmost terminal of the module housing 210.

For example, as shown in FIGS. 1 and 2, the battery pack 1000 may include seven battery modules 200. In addition, the battery pack 1000 may include 14 connection plates 220. Also, the connection portions of six first connection plate 221 provided to each of the seven battery modules 200 may be formed to protrusively extend forward further to the foremost terminal of the module housing 210 so as to be in contact with the connection portions 227 of the six second connection plates 222.

Thus, according to this configuration of the present disclosure, since the connection portion 227 of at least one of the first connection plate 221 and the second connection plate 222 has the expanded structure 221*b* protrusively extending forward further to the foremost terminal of the module housing 210 or protrusively extending rearward further to the rearmost terminal of the module housing 210, one connection plate 221 may be in contact with the other connection plate 222 without a separate connection member. Accordingly, the manufacturing cost of the battery pack 1000 may be reduced and the manufacturing process may be simplified.

Also, referring to FIG. 1 again, among the plurality of battery modules 200, 201, 202, 203, 204, 205, 206 included in the battery pack 1000, any one battery module 206 may include an external input/output bus bar 290. Specifically, the external input/output bus bar 290 may be provided to the battery module 206 located at an outermost front side. Further, the external input/output bus bar 290 may be electrically connected to the first connection plate 221 of the battery module 206. In addition, the external input/output bus bar 290 may be bent forward, and then its bent end may be bent again upward.

Figure 5:
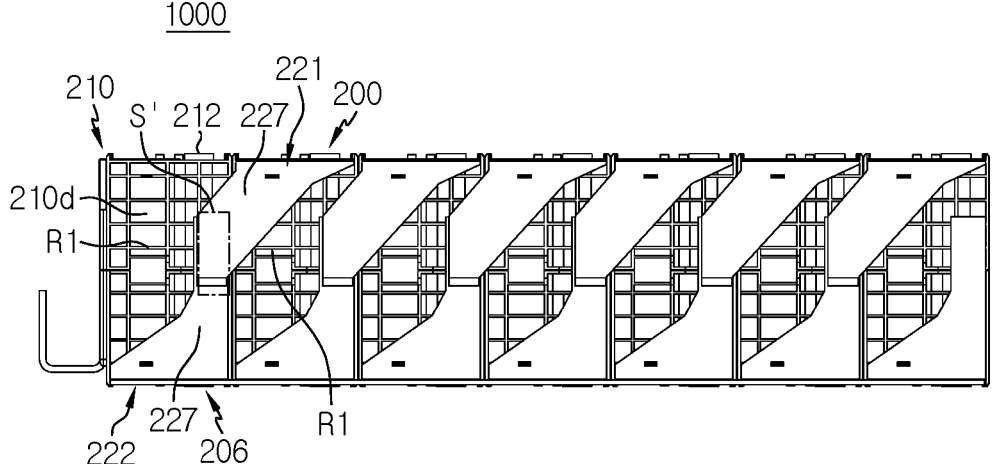
FIG. 5 is a side view schematically showing the battery pack according to an embodiment of the present disclosure.

FIG. 5 is a side view schematically showing the battery pack according to an embodiment of the present disclosure.

Referring to FIGS. 1 and 5, a rib R1 may be formed at the outer wall 210*d* of the module housing 210 to protrusively extend in the horizontal direction from an outer surface thereof. Specifically, the rib R1 may be formed at the left and right outer wall 210*d* of the module housing 210. Also, the rib R1 may have a protruding wall having a structure extending in the vertical direction and a structure extending in the front and rear direction. The protruding wall may have a shape protrusively extending outward from an outer wall of the hollow H1 or an outer wall of the fixing tube 212 located outside the module housing 210.

Moreover, the rib R1 may be formed to support the connection portions 227 of the first connection plate 221 and the second connection plate 222 in an outer direction (the horizontal direction). For example, as shown in FIG. 5, the protruding wall of the rib R1 of the module housing 210 of the battery module 206 is formed at a location facing a region S' where the connection portion 227 of the first connection plate 221 and the connection portion 227 of the second connection plate 222 overlap each other to support the connection portions 227 outward.

Thus, according to this configuration of the present disclosure, since the outer wall 210*d* of the module housing 210 has the rib R1 protrusively extending in the horizontal direction from the outer surface thereof, it is possible to secure a predetermined mechanical rigidity of the outer wall 210*d* of the module housing 210 and form an empty space in the outer wall 210*d* of the module housing 210, thereby reducing the weight of the module housing 210. Also, since the rib R1 has the protruding wall protrusively extending outward to support the connection portions 227 of the first connection plate 221 and the second connection plate 222, the welding process may be easily performed between the connection plates 220. In addition, since the rib R1 may form an empty space between the outer wall 210*d* of the module housing 210 and the connection portions 227 of the first connection plate 221 and the second connection plate 222, it is possible to minimize the damage to the module housing 210 caused by the heat of welding.

Meanwhile, referring to FIG. 2 again, the module housing 210 may include a fixing tube 212 having a hollow structure H5 penetrated in the vertical direction. Specifically, the fixing tube 212 may be located at left and right outer sides, respectively. For example, as shown in FIG. 2, the fixing tube 212 may be located at a left rear end of the module housing 210. Also, another fixing tube 212 may be located at a right rear end of the module housing 210.

Moreover, the fixing tube 212 may be used to insert a fixing bolt (not shown) for fixing the battery module 200 to a floor or a ceiling at a specific installation location.

Thus, according to this configuration of the present disclosure, since the fixing tube 212 having the hollow structure H5 is provided to the module housing 210, a fixing bolt may be easily inserted and fixed such that the battery pack 1000 including the plurality of battery modules 200 may be stably fixed to an installation site.

Meanwhile, referring to FIGS. 2 and 3 again, the fixing tube 212 may have a vertical terminal protrusively extending in a vertical direction to the upper surface or the lower surface of the module housing 210, respectively.

In addition, a guide holes H2 perforated in a vertical direction may be formed in the body portion 225 so that the terminal of the fixing tube 212 protruding in a vertical direction is inserted therein.

Specifically, the terminal of the fixing tube 212 protruding upward may have a structure protruding upward further to the upper surface of the module housing 210. Further, the terminal of the fixing tube 212 protruding downward may have a structure protruding downward further to the lower surface of the module housing 210.

For example, as shown in FIG. 2, two guide holes H2 may be formed in the body portion 225 of the first connection plate 221. The terminal of the fixing tube 212 protruding upward may be inserted into each of the two guide holes H2. Moreover, for example, as shown in FIG. 3, two guide holes H2 may be formed in the body portion 225 of the second connection plate 222. The terminal of the fixing tube 212 protruding downward may be inserted into each of the two guide holes H2.

Thus, according to this configuration of the present disclosure, since the guide hole H2 perforated in the vertical direction is formed at the body portion 225 so that the terminal of the fixing tube 212 protruding in a vertical direction is inserted therein, the first connection plate 221 and the second connection plate 222 may be guided to be mounted in place at the upper portion or the lower portion of the module housing 210. Accordingly, the connection terminals 225c of the first connection plate 221 and the second connection plate 222 may be disposed at locations corresponding to the electrode terminals 111 of the plurality of cylindrical battery cells 100, thereby increasing the manufacturing efficiency and the product completion more effectively.

In addition, referring to FIG. 5 again, the connection portion 227 may be located to face the left and right outer sides of the fixing tube 212 located at the outer wall 210d. Specifically, the fixing tube 212 provided to the module housing 210 has a hollow structure H5 with an empty inside. In other words, the fixing tube 212 may be formed adjacent to the left and right outer walls 210d of the module housing 210 to give a predetermined distance between the connection portions 227 and the plurality of cylindrical battery cells 100 welded to each other for electrical connection between the first connection plate 221 and the second connection plate 222.

Thus, according to this configuration of the present disclosure, since the overlapped region S' of the connection portions 227 of the first connection plate 221 and the second connection plate 222 is located to face the left outer side or the right outer side of the fixing tube 212, the amount of heat generated during the welding process of the connection portion 227 and transferred to the cylindrical battery cells 100 of the battery module 200 may be minimized. Accordingly, it is possible to prevent that the performance of the cylindrical battery cell 100 deteriorates or a fire occurs due to overheating that may occur in the welding process, thereby effectively reducing the defective rate.

Figure 6:
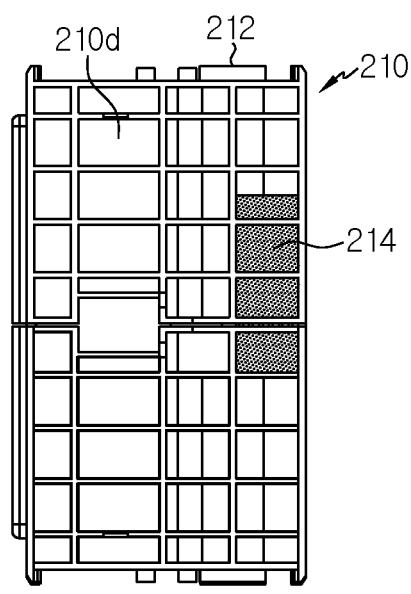
FIG. 6 is a side view schematically showing a battery module, employed at the battery pack according to another embodiment of the present disclosure.

FIG. 6 is a side view schematically showing a battery module, employed at the battery pack according to another embodiment of the present disclosure.

Referring to FIG. 6 along with FIG. 5, in a battery module 200B according to another embodiment, unlike the module housing 210 of FIG. 5, a protection plate 214 having a plate shape with a predetermined thickness may be formed at left and right outer walls of the module housing 210. Specifically, the protection plate 214 may be ridged outward from the left and right outer walls 210d of the module housing 210.

More specifically, the protection plate 214 may have a size corresponding to the size of the portion S' (FIG. 5) where the connection portions 227 of the first connection plate 221 and the second connection plate 222 overlap each other. In addition, the protection plate 214 may be formed at a location corresponding to the location of the overlapped region of the connection portions 227 of the first connection plate 221 and the second connection plate 222.

For example, referring to FIG. 6, the protection plate 214 having a plate shape with a predetermined thickness may be formed at the right outer wall 210d of the module housing 210. The protection plate 214 may be located at a portion where the connection portions 227 of the first connection plate 221 and the second connection plate 222 overlap each other.

Thus, according to this configuration of the present disclosure, since the module housing 210 includes the protection plate 214 having a plate shape with a predetermined thickness and formed at the left and right outer walls thereof, when the connection portions 227 of the first connection plate 221 and the second connection plate 222 are welded to each other, the welding heat may be prevented from being conducted into the inside of the module housing 210. As a result, it is possible to minimize damage to the battery module 200 caused by welding between the connection plates 220.

Figure 7:
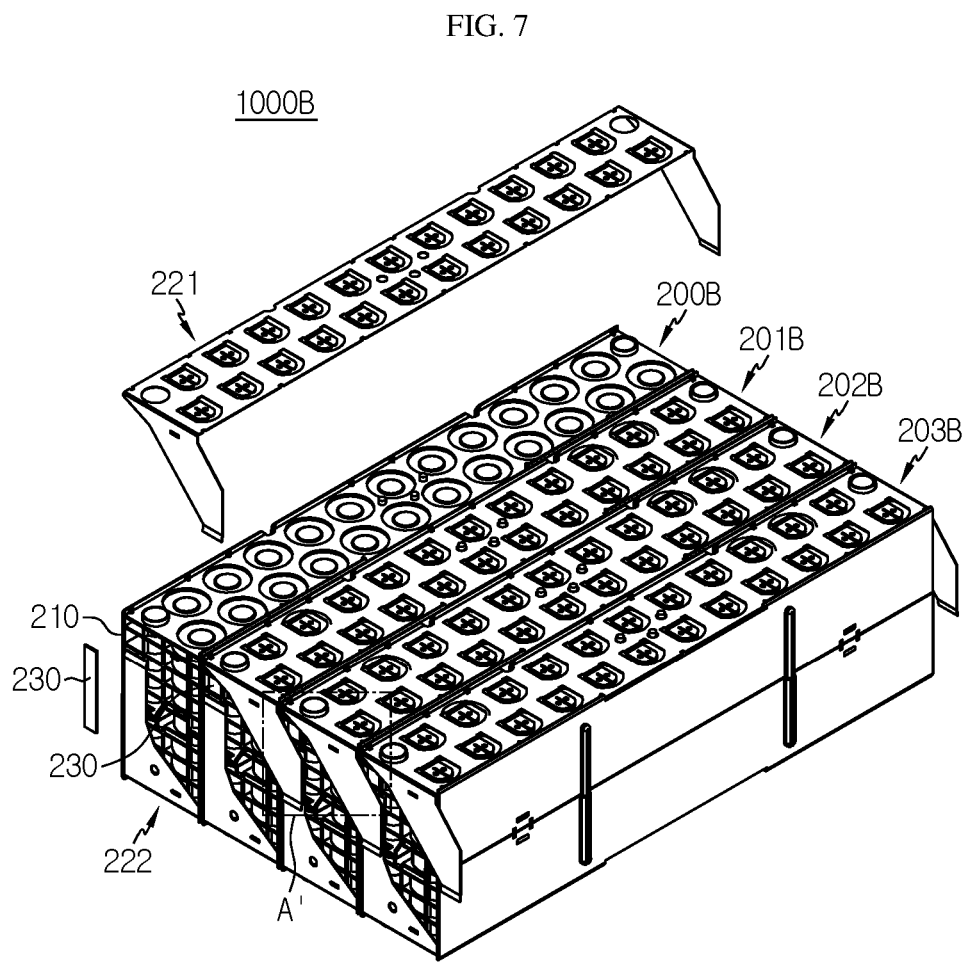
FIG. 7 is a perspective view schematically showing a battery pack according to another embodiment of the present disclosure.

FIG. 7 is a perspective view schematically showing a battery pack according to another embodiment of the present disclosure. Also, FIG. 8 is an enlarged view schematically showing a region A' of the battery pack of FIG. 7.

Figure 8:
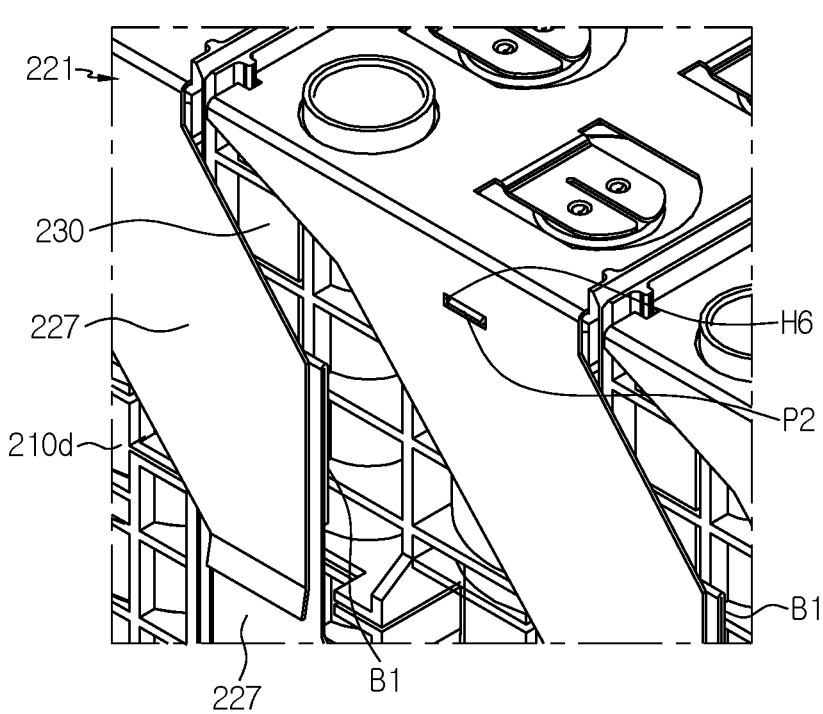
FIG. 8 is an enlarged view schematically showing a region A' of the battery pack of FIG. 7.

Referring to FIGS. 7 and 8, the battery module 200B, 201B, 202B, 203B of the battery pack 1000B according to another embodiment of the present disclosure may further include a protection member 230 having a plate shape with a predetermined thickness. Specifically, at least a portion of the protection member 230 may be inserted and fixed at a location (portion) of the outer wall 210d of the module housing 210 facing the connection portion 227. In addition, the protection member 230 may include a material with a large specific heat or a material with low thermal conductivity. For example, the protection member 230 may include a metal or plastic with low thermal conductivity and excellent heat resistance. More specifically, the protection member 230 may be a plastic material with excellent heat resistance such as aromatic polyamide, polyimide, polysulfone, polyimidazole pyrrolone, polybenzoimidazole, polyphenylene oxide and the like.

For example, referring to FIG. 8, the protection member 230 having a plate shape with a predetermined thickness may be inserted into the right outer wall 210d of the module housing 210. The protection member 230 may be located to correspond to a portion where the connection portions 227 of the first connection plate 221 and the second connection plate 222 overlap each other.

Thus, according to this configuration of the present disclosure, since the protection member 230 is inserted and fixed at a location (portion) of the outer wall 210*d* of the module housing 210 facing the connection portion 227, when the connection portions 227 of the first connection plate 221 and the second connection plate 222 are welded to each other, it is possible to reduce the amount of welding heat conducted into the inside of the module housing 210 or to prevent the module housing 210 from being melted and damaged. As a result, damage to the battery module 200 caused by welding between the connection plates 221, 222 may be minimized.

Referring to FIGS. 7 and 8 again, the connection portion 227 may have a bent structure B1 at which an end thereof is bent upward or downward. Specifically, the connection portion 227 of any one of the first connection plate 221 and the second connection plate 222 may have the bent structure B1 at an upper end or a lower end. In addition, an end area of the bent structure may be equal to or smaller than the overlapped size of the connection portions 227 of the first connection plate 221 and the second connection plate 222. In particular, the bent structure B1 may be formed at a region where the connection portions 227 of the first connection plate 221 and the second connection plate 222 are welded to each other.

Further, a gap of a predetermined distance may be formed between the end of the connection portion 227 and the bent structure B1. This gap may effectively reduce the amount of welding heat generated during the welding process of the connection portions 227 and conducted to the inside of the module housing 210.

For example, as shown in FIG. 8, a bent structure B1 may be further formed at an upper end of the connection portion 227 of the second connection plate 222. In addition, the portion where the bent structure B1 of the connection portion 227 of the second connection plate 222 is formed may overlap the connection portion 227 of the first connection plate 221. Further, the end of the connection portion 227 of the second connection plate 222 and the bent structure B1 may be welded to the end of the connection portion 227 of the first connection plate 221.

Thus, according to this configuration of the present disclosure, since the bent structure B1 is formed at the end of the connection portion 227 bent upward or downward, when the connection portions 227 of the first connection plate 221 and the second connection plate 222 are welded to each other, it is possible to effectively reduce the amount of generated welding heat conducted to the inside of the module housing 210, without any separate member. Accordingly, damage to the battery module 200 caused by welding between the connection plates 220 may be minimized.

Referring to FIGS. 7 and 8 again, a fixing hole H6 may be formed in the connection portions 227 of each of the first connection plate 221 and the second connection plate 222. Further, a fixing protrusion P2 may be formed on the outer wall 210*d* of the module housing 210. Specifically, the fixing hole H6 may have a shape perforated in the left and right direction so that a protruding portion of the fixing protrusion P2 may be inserted therein. In addition, the fixing protrusion P2 may protrude from the outer wall 210*d* of the module housing 210 in the left or right direction.

Thus, according to this configuration of the present disclosure, since the fixing hole H6 and the fixing protrusion P2 are provided to the battery module, the connection portion 227 of each of the first connection plate 221 and the second connection plate 222 may be guided to be placed at a suitable location on left and right outer walls of the module housing 210. Accordingly, the assembling process may be easily performed, thereby shortening the manufacturing time.

Figure 9:
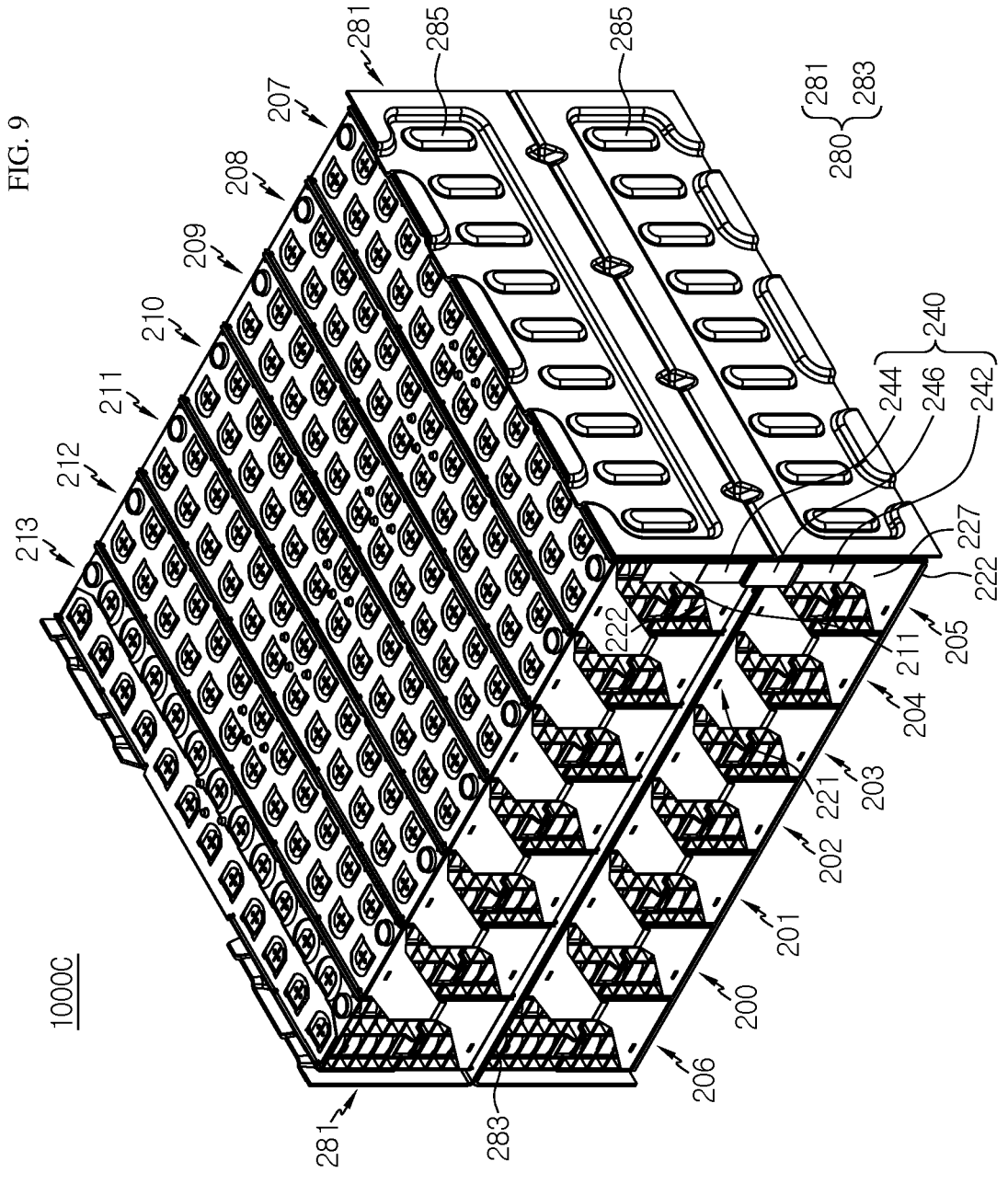
FIG. 9 is a perspective view schematically showing a battery pack according to an embodiment of the present disclosure.

FIG. 9 is a perspective view schematically showing a battery pack according to an embodiment of the present disclosure.

Referring to FIG. 9, the battery pack 1000C of the present disclosure may further include a plurality of other battery modules 207, 208, 209, 210, 211, 212, 213 located above the plurality of battery modules 200, 201, 202, 203, 204, 205, 206. Moreover, the plurality of other battery modules located on top of the plurality of battery modules 200, 201, 202, 203, 204, 205, 206 and the plurality of other battery modules 207, 208, 209, 210, 211, 212, 213 located above the plurality of battery modules 200, 201, 202, 203, 204, 205, 206 may be mounted to a mounting structure 280.

Specifically, the mounting structure 280 may include pillar portions 281 respectively located at front and rear sides thereof and having a vertically standing plate shape, and a mounting portion 283 connected to the front and rear pillar portions 281 so that the plurality of battery modules 200 are located therebelow and mounted thereon, the mounting portion 283 having a plate shape lying down in the horizontal direction. That is, the mounting structure 280 may have an 'H' shape as a whole. Here, the mounting structure 280 may include a material such as steel, stainless steel, or the like plated with a non-conductive material through which electricity does not pass.

In addition, the pillar portion 281 may have a beading structure 285 formed therein and ridged inward or outward. The beading structure 285 may increase the mechanical rigidity of the pillar portion 281. For example, the mounting structure 280 may be made of steel or stainless steel.

Further, a connection bus bar 240 may be provided to electrically connect at least two first connection plates 221, or at least two second connection plates 222, or the first connection plate 221 and the second connection plate 222, respectively provided at the plurality of battery modules 200, 201, 202, 203, 204, 205, 206 and the plurality of other battery modules 207, 208, 209, 210, 211, 212, 213 located above the plurality of battery modules 200, 201, 202, 203, 204, 205, 206. In addition, the connection bus bar 240 may include an electrically conductive material. For example, the electrically conductive material may be a metal alloy mainly containing copper, nickel, aluminum, gold, silver, and the like.

Specifically, the connection bus bar 240 may include a first contact portion 242, a second contact portion 244, and a detouring portion 246. More specifically, the first contact portion 242 may have a plate elongated downward to be in contact with any one of the first connection plate 221 and the second connection plate 222. In addition, the second contact portion 244 may have a plate elongated upward to be in contact with the other of the first connection plate 221 and the second connection plate 222. Moreover, both ends of the detouring portion 246 may be connected with the first contact portion 242 and the second contact portion 244, respectively. In addition, the detouring portion 246 may have a plate stepped outward from the first contact portion 242 and the second contact portion 244.

For example, as shown in FIG. 9, one connection bus bar 240 may be provided to electrically connect two second connection plates 222 provided at the battery modules 200, 201, 202, 203, 204, 205, 206 located in a first layer (a lower side) of the battery pack 1000C and the battery modules 207, 208, 209, 210, 211, 212, 213 located in a second layer (an upper side) of the battery pack 1000C.

In addition, the connection bus bar 240 may include a first contact portion 242 in contact with the second connection plate 222 provided to the battery module 205 of the first layer and a second contact portion 244 in contact with the second connection plate 222 of the battery module 207 of the second layer. Also, a detouring portion 246 configured to connect the first contact portion 242 and the second contact portion 244 to each other and stepped outward from the first contact portion 242 and the second contact portion 244 may be provided.

Thus, according to this configuration of the present disclosure, since the battery pack 1000C includes the connection bus bar 240 having the first contact portion 242, the second contact portion 244 and the detouring portion 246, the plurality of battery modules 200 and the plurality of other battery modules 200 located thereabove may electrically connected in an easy way without causing shorting between the plurality of battery modules 200, 201, 202, 203, 204, 205, 206 and the plurality of other battery modules 207, 208, 209, 210, 211, 212, 213, thereby increasing the manufacturing efficiency and safety.

Figure 10:
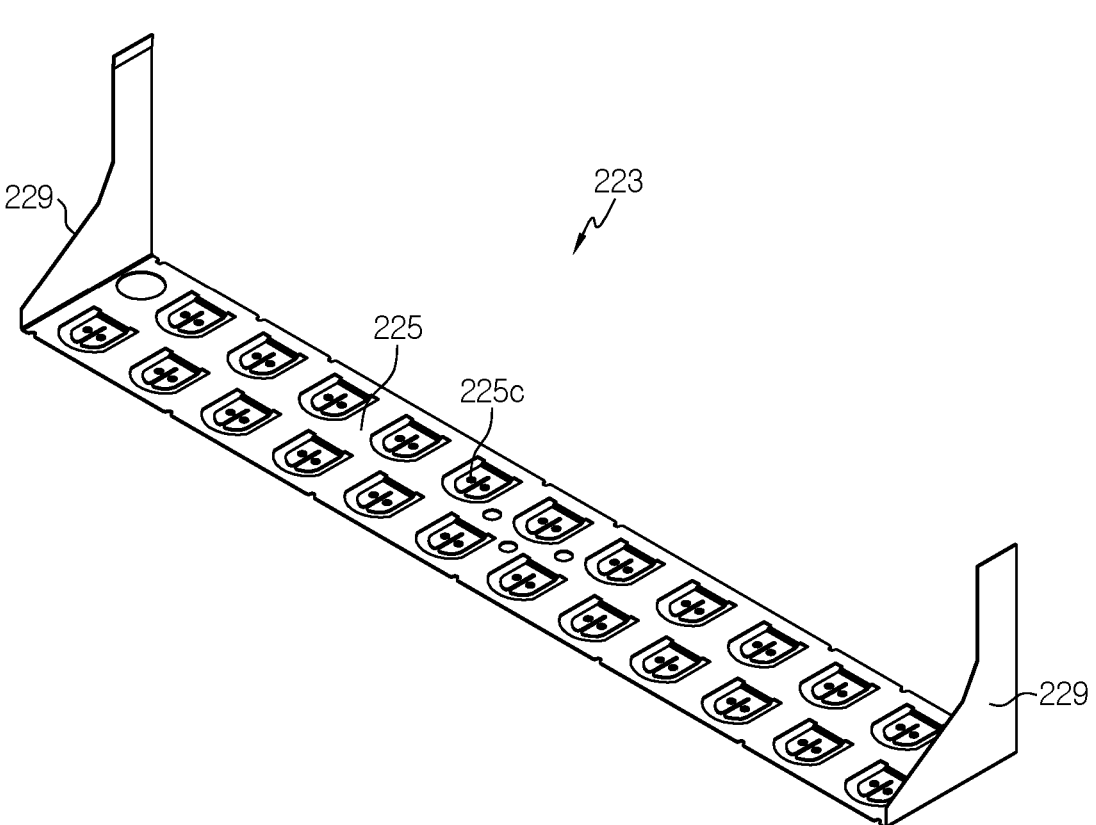
FIG. 10 is a perspective view schematically showing a third connection plate of a battery module according to still another embodiment of the present disclosure.

FIG. 10 is a perspective view schematically showing a third connection plate of a battery module according to still another embodiment of the present disclosure. Also, FIG. 11 is a side view schematically showing a battery pack according to still another embodiment of the present disclosure.

Figure 11:
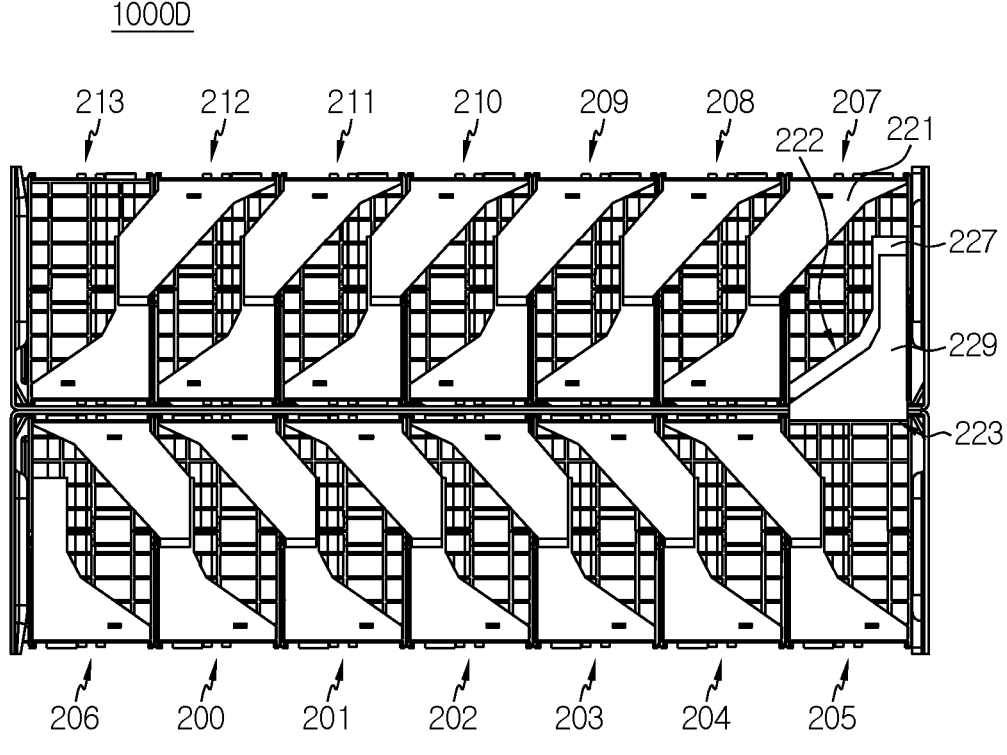
FIG. 11 is a side view schematically showing a battery pack according to still another embodiment of the present disclosure.

Referring to FIGS. 10 and 11, a battery pack 1000D according to another embodiment of the present disclosure may include a plurality of battery modules 200, 201, 202, 203, 204, 205, 206, a plurality of other battery modules 207, 208, 209, 210, 211, 212, 213 located above or below the plurality of battery modules 200, 201, 202, 203, 204, 205, 206, and a third connection plate 223 configured to electrically connect the plurality of battery modules 200, 201, 202, 203, 204, 205, 206 and the plurality of other battery modules 207, 208, 209, 210, 211, 212, 213 located thereabove or therebelow.

For example, the battery pack 1000D may further include a plurality of other battery modules 207, 208, 209, 210, 211, 212, 213 located in a second layer provided above the plurality of battery modules 200, 201, 202, 203, 204, 205, 206 located in a first layer (a lower side). At this time, the plurality of other battery modules 207, 208, 209, 210, 211, 212, 213 of the second layer located at the upper side of the battery pack 1000D may be arranged in a direction opposite to the arrangement direction of the plurality of battery modules 200, 201, 202, 203, 204, 205, 206 of the first layer located at the lower side of the battery pack 1000D.

For example, as shown in FIG. 11, the plurality of battery modules 200, 201, 202, 203, 204, 205, 206 of the first layer located at the lower side of the battery pack 1000D may be arranged from front to rear. Also, the plurality of other battery modules 207, 208, 209, 210, 211, 212, 213 of the second layer located at the upper side of the battery pack 1000D may be arranged from rear to front.

In addition, the battery pack 1000D may include a first connection plate 221 and a second connection plate 222 provided to any one battery module 205 among the plurality of battery modules 200, 201, 202, 203, 204, 205, 206 located in the first layer, and additionally include a third connection plate 223 electrically connected to the plurality of other battery modules 207, 208, 209, 210, 211, 212, 213. Specifically, the third connection plate 223 include a body portion 225 having a plurality of connection terminals 225c located at the upper portion or the lower portion of the plurality of cylindrical battery cells 100 and in electrical contact and connection with the electrode terminal 111 formed at one of the plurality of cylindrical battery cells 100.

Further, the third connection plate 223 may include a second connection portion 229 configured to be in contact and connection with a portion of the connection plate 220 of the plurality of other battery modules 207, 208, 209, 210, 211, 212, 213 mounted to the upper side. In addition, the second connection portion 229 may be bent and extending upward or downward from the left or right end of the body portion 225.

For example, as shown in FIG. 10, the third connection plate 223 may include a body portion 225 having a plurality of connection terminals 225c formed to be in electrical contact and connection with the electrode terminal 111 formed at one of the plurality of cylindrical battery cells 100. Further, the third connection plate 223 may include two second connection portions 229 formed at both left and right ends of the body portion 225 to be in contact and connection with a portion of the connection plate 220 of another battery module 207 mounted to the upper side. In addition, the two second connection portions 229 may be bent and extending upward.

That is, in the battery pack 1000D, the plurality of battery modules 200, 201, 202, 203, 204, 205, 206 located in the lower side (the first layer) and the plurality of other battery modules 207, 208, 209, 210, 211, 212, 213 located in the upper side (the second layer) may be electrically connected to each other by means of the third connection plate 223.

Thus, according to this configuration of the present disclosure, in the battery pack 1000D according to another embodiment, by using the third connection plate 223, without a separate bus bar configuration, the plurality of cylindrical battery cells 100 of one battery module 205 may be electrically connected and simultaneously may be electrically connected to the connection plate 220 of another battery module 207 located at the upper side or the lower side. Accordingly, it is possible to shorten the manufacturing time of the battery pack and reduce the manufacturing cost.

Figure 12:
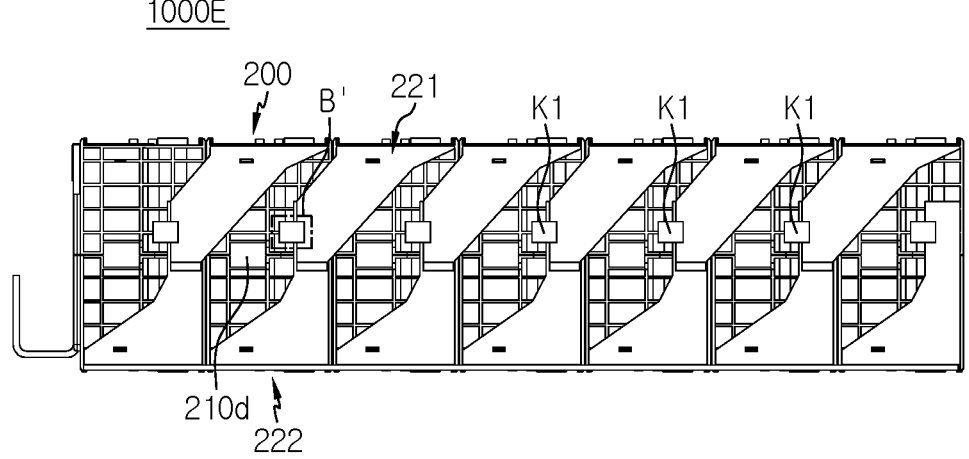
FIG. 12 is a side view schematically showing a battery module, employed at the battery pack according to another embodiment of the present disclosure.

FIG. 12 is a side view schematically showing a battery module, employed at the battery pack according to another embodiment of the present disclosure. Also, FIG. 13 is an enlarged view schematically showing a region B' of the battery pack of FIG. 12.

Figure 13:
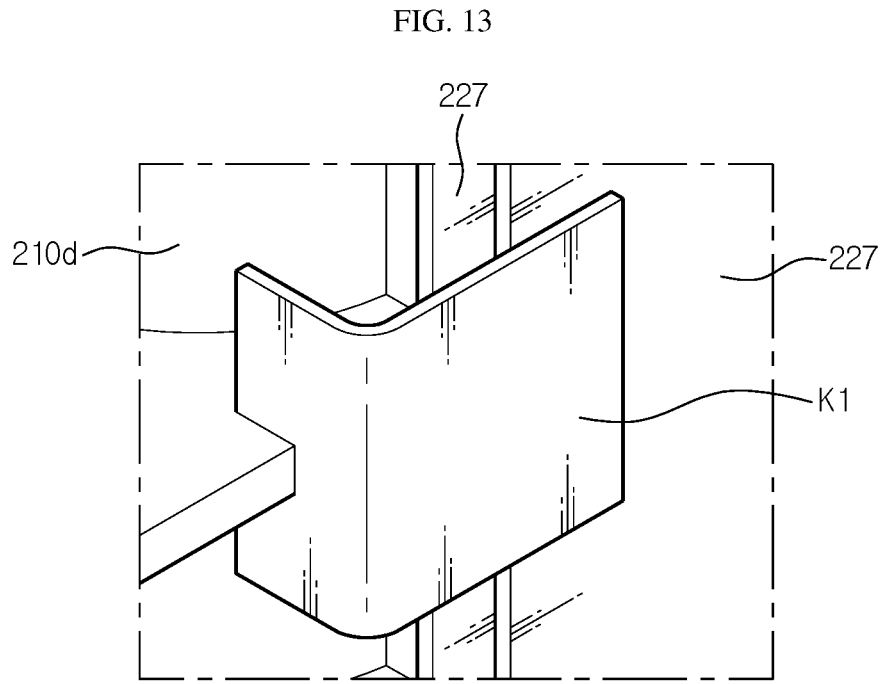
FIG. 13 is an enlarged view schematically showing a region B' of the battery pack of FIG. 12.

Referring to FIGS. 12 and 13, the battery pack 1000E may include a plurality of battery modules 200. Also, a hook structure K1 may be formed at the outer wall 210d of the module housing 210 provided to the battery module 200 such that the connection portion 227 of each of the connection plates 221, 222 is closely fixed to the outer wall 210d of the module housing 210. Specifically, the hook structure K1 may protrusively extend from the outer wall 210d of the module housing 210 in the outer direction (the left and right direction).

For example, as shown in FIG. 12, the battery pack 1000E may include seven battery modules 200. In addition, seven hook structures K1 may be formed at the left and right outer walls 210d of the module housings 210 respectively provided to the seven battery modules 200 such that the connection portions 227 of each of the connection plates 221, 222 is closely fixed to the outer wall of the module housing 210.

Thus, according to this configuration of the present disclosure, since the hook structure K1 is formed at the left and right outer walls 210d of the module housing 210, the connection portion 227 of the connection plate 220 may be fixed by the hook structure K1 protrusively extending outward. Accordingly, when the connection portions 227 of the two connection plates 220 are welded, the connection portions 227 may be stably fixed, thereby greatly increasing the welding efficiency. In addition, when an external shock is applied to the battery pack 1000, it is possible to prevent the connection portions 227 of the bonded connection plates 220 from being separated.

Meanwhile, the battery pack 1000 may include several electrical components (not shown) along with the plurality of battery modules 200, 201, 202, 203, 204, 205, 206. In addition, the electrical components are also referred to as electrical equipment. Representative examples of the electrical equipment included in the battery pack 1000 include a relay, a current sensor, a fuse, a battery management system (BMS), and the like. The electrical equipment is a component for managing charge and discharge of the cylindrical battery cells 100 included in the battery pack and ensuring safety, and may be regarded as an essential component of most battery packs.

Meanwhile, the present disclosure may provide an electronic device including the battery pack. Specifically, the electronic device may be a large-capacity energy storage device including at least one battery pack. In addition, the electronic device may have an electronic system for checking or controlling the state of the battery pack.

Meanwhile, the present disclosure may provide a vehicle including the battery pack. Specifically, the vehicle may be an electric vehicle including at least one battery pack. Further, the vehicle may have an electronic system for checking or controlling the state of the battery pack.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 1000: battery pack | 100: cylindrical battery cells |
| 200, 201, 202, 203, 204, 205, 206, 207, 208, 209, 210, 211, 212, 213: battery module | |
| 111, 111a, 111b: electrode terminal, first electrode terminal, second electrode terminal | |
| 220, 221, 222: connection plate, first connection plate, second connection plate | |
| 225: body portion | 227: connection portion |
| 210: module housing | 210a, 210b, 210c, 210d: outer wall |
| 221b: expanded structure | R1: rib |
| 212: fixing tube | H1: hollow |
| H2: guide hole | 214: protection member |
| 230: protection member | B1: bent structure |
| 240: connection bus bar | |
| 242, 244, 246: first contact portion, second contact portion, detouring portion | |
| 223: third connection plate | 229: second connection portion |
| K1: hook structure | H3: connection opening |
| 225c: connection terminal | 213, 215: coupling protrusion, guide groove |

INDUSTRIAL APPLICABILITY

The present disclosure relates to a battery pack including a connection plate. In addition, the present disclosure is available for industries associated with electronic devices or vehicles including the battery pack.

What is claimed is:

1. A battery pack, comprising:
   a plurality of battery modules arranged in a front and rear direction,
   wherein each of the plurality of battery modules includes:
   a plurality of cylindrical battery cells arranged in a horizontal direction and having electrode terminals formed at an upper portion and a lower portion thereof, respectively;
   a module housing having a plurality of hollows in which the plurality of cylindrical battery cells are accommodated; and
   a connection plate having a body portion at the upper portion or the lower portion of the plurality of cylindrical battery cells and provided with a plurality of connection terminals respectively in electrical contact and connection with the electrode terminal at one of the plurality of cylindrical battery cells, and a connection portion configured to protrusively extend in a left direction or a right direction from the body portion so that the protrusively extending portion is bent upward or downward from the body portion and the bent end is in electrical contact and connection with a portion of a connection plate of an adjacent one of the battery modules;
   wherein the connection plate includes:
   a first connection plate having a second body portion at the upper portion of the plurality of cylindrical battery cells and having a second connection portion protrusively extending from the body portion and bent downward; and
   a second connection plate having a second body portion at the lower portion of the plurality of cylindrical battery cells and having a second connection portion protrusively extending from the body portion and bent upward,
   wherein the first connection portion of the first connection plate is in electrical contact and connection with the second connection portion of the second connection plate provided at another battery module, and
   wherein the connection portion of the first connection plate does not extend beyond a rear surface of the respective battery module in the front and rear direction.

2. The battery pack according to claim 1,
   wherein a rib is at an outer wall of the module housing to protrusively extend in a horizontal direction from an outer surface thereof.

3. The battery pack according to claim 1,
   wherein the module housing includes fixing tubes at left and right outer sides thereof and having a hollow structure projecting from an upper surface of the module housing in a vertical direction.

4. The battery pack according to claim 3,
   wherein at least one of the fixing tubes has a vertical terminal protrusively extending in a vertical direction from the upper surface of the module housing, and
   wherein the first body portion of the first connection plate has a guide hole perforated in a vertical direction so that the vertical terminal of the at least one of the fixing tubes protruding in the vertical direction is inserted through the guide hole.

5. The battery pack according to claim 3,
wherein the connection portion of the connection plate faces left and right outer sides of the fixing tube.

6. The battery pack according to claim 1,
wherein the module housing includes a protection plate ridged outward from left and right outer walls thereof and having a plate shape with a predetermined thickness.

7. The battery pack according to claim 1,
wherein each of the plurality of battery modules further includes a protection member at least partially inserted and fixed in an outer wall of the module housing facing the connection portion and having a plate shape with a predetermined thickness.

8. The battery pack according to claim 1,
wherein the second connection portion has a bent structure at which an end thereof is bent upward or downward folded over.

9. The battery pack according to claim 1, further comprising:
a plurality of other battery modules above the plurality of battery modules,
wherein a connection bus bar having an electrically conductive material electrically connects at least two first connection plates, or at least two second connection plates, or a first connection plate and a second connection plate, respectively included in the plurality of battery modules and the plurality of other battery modules above the plurality of battery modules,
wherein the connection bus bar includes:
a first contact portion in contact with any one of the first connection plate and the second connection plate;
a second contact portion in contact with the other of the first connection plate and the second connection plate; and
a detouring portion having both ends respectively connected to the first contact portion and the second contact portion, the detouring portion being stepped outward from the first contact portion and the second contact portion.

10. The battery pack according to claim 1, further comprising:
a plurality of battery modules;
a plurality of other battery modules above or below the plurality of battery modules; and
a third connection plate configured to electrically connect the plurality of battery modules and the plurality of other battery modules above or below the plurality of battery modules,
wherein the third connection plate includes:
a body portion at the upper portion or the lower portion of the plurality of cylindrical battery cells and having a plurality of connection terminals respectively in electrical contact and connection with the electrode terminal at one of the plurality of cylindrical battery cells; and
a second connection portion configured to be bent and extending upward or downward from a left or right end of the body portion to be in contact and connection with a portion of a connection plate of another battery module mounted to an upper side.

11. The battery pack according to claim 1,
wherein a hook structure is at left and right outer walls of the module housing to protrusively extend outward from the outer walls of the module housing so that the connection portion of the connection plate is closely fixed to the outer wall of the module housing.

12. The battery pack according to claim 1,
wherein the connection portion of the second connection plate does not extend beyond the front surface of the respective battery module in the front and rear direction and does not extend beyond the rear surface of the respective battery module in the front and rear direction.

13. An electronic device, comprising the battery pack according to claim 1.

14. A vehicle, comprising the battery pack according to claim 1.

15. A battery pack, comprising:
a plurality of battery modules arranged in a front and rear direction,
wherein each of the plurality of battery modules includes:
a plurality of cylindrical battery cells arranged in a horizontal direction and having electrode terminals formed at an upper portion and a lower portion thereof, respectively;
a module housing having a plurality of hollows in which the plurality of cylindrical battery cells are accommodated; and
a connection plate having a body portion at the upper portion or the lower portion of the plurality of cylindrical battery cells and provided with a plurality of connection terminals respectively in electrical contact and connection with the electrode terminal at one of the plurality of cylindrical battery cells, and a connection portion configured to protrusively extend in a left direction or a right direction from the body portion so that the protrusively extending portion is bent upward or downward from the body portion and the bent end is in electrical contact and connection with a portion of a connection plate of an adjacent one of the battery modules;
wherein the connection plate includes:
a first connection plate having a second body portion at the upper portion of the plurality of cylindrical battery cells and having a second connection portion protrusively extending from the body portion and bent downward; and
a second connection plate having a second body portion at the lower portion of the plurality of cylindrical battery cells and having a second connection portion protrusively extending from the body portion and bent upward,
wherein the first connection portion of the first connection plate is in electrical contact and connection with the second connection portion of the second connection plate provided at another battery module, and
wherein at least one of the first connection portion and the second connection portion has an expanded structure protrusively extending forward further to a foremost terminal of the module housing or protrusively extending rearward further to a rearmost terminal of the module housing.

16. The battery pack according to claim 15,
wherein the connection portion of the other one of the first connection plate and the second connection plate does not extend further forward than a foremost terminal of the module housing and does not extend further rearward than a rearmost terminal of the module housing.

17. A battery pack, comprising:

a plurality of battery modules arranged in a front and rear direction, wherein each of the plurality of battery modules includes:

a plurality of cylindrical battery cells arranged in a horizontal direction and having electrode terminals formed at an upper portion and a lower portion thereof, respectively;

a module housing having a plurality of hollows in which the plurality of cylindrical battery cells are accommodated; and a connection plate having a body portion at the upper portion or the lower portion of the plurality of cylindrical battery cells and provided with a plurality of connection terminals respectively in electrical contact and connection with the electrode terminal at one of the plurality of cylindrical battery cells, and a connection portion configured to protrusively extend in a left direction or a right direction from the body portion so that the protrusively extending portion is bent upward or downward from the body portion and the bent end is in electrical contact and connected with a portion of a connection plate of an adjacent one of the battery modules;

wherein the module housing includes fixing tubes at left and right outer sides thereof and having a hollow structure projecting from an upper surface of the module housing in a vertical direction, wherein the connection portion of the connection plate faces an outer side of one of the fixing tubes, wherein the one of the fixing tubes has a vertical terminal protrusively extending in a vertical direction from the upper surface of the module housing, and wherein the body portion of the connection plate has a guide hole perforated in a vertical direction so that the vertical terminal of the one of the fixing tubes protruding in the vertical direction is inserted through the guide hole.

18. The battery pack according to claim 17, wherein the connection plate includes:

a first connection plate having a first body portion at the upper portion of the plurality of cylindrical battery cells and provided with a plurality of first connection terminals respectively in electrical contact and connection with the electrode terminals at the upper portion of the plurality of cylindrical battery cells, and a first connection portion configured to protrusively extend from a left end or a right end of the first body portion so that the first connection portion is bent downward from the first body portion, wherein the first connection portion extends beyond a front surface of the respective battery module in a front-rear direction and does not extend beyond a rear surface of the respective battery module in the front-rear direction; and a second connection plate having a second body portion at the lower portion of the plurality of cylindrical battery cells and provided with a plurality of second connection terminals respectively in electrical contact and connection with the electrode terminals at the lower portion of the plurality of cylindrical battery cells, and a second connection portion configured to protrusively extend from a left end or a right end of the second body portion so that the second connection portion is bent upward from the second body portion, wherein the second connection portion does not extend beyond the front surface of the respective battery module in the front-rear direction and does not extend beyond the rear surface of the respective battery module in the front-rear direction, and wherein the first connection portion of the respective one of the battery modules is in contact and connection with the second connection portion of the adjacent one of the battery modules.

* * * * *